United States Patent
Maki et al.

(10) Patent No.: US 12,014,861 B2
(45) Date of Patent: Jun. 18, 2024

(54) METHOD OF MANUFACTURING ELECTRONIC COMPONENT AND ELECTRONIC COMPONENT

(71) Applicant: Murata Manufacturing Co., Ltd., Kyoto-fu (JP)

(72) Inventors: Yoshifumi Maki, Nagaokakyo (JP); Takuya Ishida, Nagaokakyo (JP); Shinya Hirai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/170,419

(22) Filed: Feb. 16, 2023

(65) Prior Publication Data

US 2023/0197331 A1 Jun. 22, 2023

Related U.S. Application Data

(60) Division of application No. 16/374,649, filed on Apr. 3, 2019, now Pat. No. 11,605,493, which is a
(Continued)

(30) Foreign Application Priority Data

Dec. 13, 2016 (JP) ................................. 2016-241005

(51) Int. Cl.
*H01F 27/28* (2006.01)
*C04B 35/26* (2006.01)
(Continued)

(52) U.S. Cl.
CPC ......... *H01F 27/2804* (2013.01); *C04B 35/26* (2013.01); *C04B 41/009* (2013.01);
(Continued)

(58) Field of Classification Search
CPC ..... C04B 35/26; H01F 41/041; H01F 41/046; H01F 41/10; H01F 17/0013
See application file for complete search history.

(56) References Cited

U.S. PATENT DOCUMENTS 5,707,459 A * 1/1998 Itoyama ................ H01L 31/049
136/251
6,311,390 B1 11/2001 Abe et al.
(Continued)

FOREIGN PATENT DOCUMENTS

CN 104465086 A 3/2015
CN 107785148 A * 3/2018 ......... B32B 37/0007
(Continued)

OTHER PUBLICATIONS

International Search Report issued in PCT/JP2017/043633; mailed Feb. 6, 2018.
(Continued)

*Primary Examiner* — Jeffrey T Carley
(74) *Attorney, Agent, or Firm* — Studebaker & Brackett PC

(57) ABSTRACT

A method of manufacturing an electronic component capable of preventing entrance of a plating solution and a flux component at an interface to which an inner electrode of a ceramic element body is extended, and capable of forming an outer electrode of an arbitrary shape. A ceramic element body is made of a ceramic material containing a metal oxide, and part of an inner electrode is extended to extended surfaces of the ceramic element body. A base electrode is formed on each of the extended surfaces using a conductive paste to be connected to the inner electrode. Part of another surface of the ceramic element body adjacent to the extended surfaces is locally heated, and part of the metal oxide is reduced to form a reformed portion. A plating
(Continued)

electrode is continuously formed over the base electrode and the reformed portion through a plating method to form outer electrodes.

3 Claims, 7 Drawing Sheets

Related U.S. Application Data continuation of application No. PCT/JP2017/043633, filed on Dec. 5, 2017.

(51) Int. Cl.
*C04B 41/00* (2006.01)
*C04B 41/45* (2006.01)
*C04B 41/88* (2006.01)
*H01F 17/00* (2006.01)
*H01F 27/29* (2006.01)
*H01F 41/04* (2006.01)
*H01F 41/10* (2006.01)
*H01G 4/232* (2006.01)
*H01G 4/30* (2006.01)

(52) U.S. Cl.
CPC .......... *C04B 41/4564* (2013.01); *C04B 41/88* (2013.01); *H01F 17/0013* (2013.01); *H01F 27/292* (2013.01); *H01F 41/041* (2013.01); *H01F 41/046* (2013.01); *H01F 41/10* (2013.01); *H01G 4/232* (2013.01); *H01G 4/30* (2013.01); *Y10T 29/4902* (2015.01)

(56) References Cited

U.S. PATENT DOCUMENTS

| 7,154,374 | B2 | 12/2006 | Ritter et al. |
| 8,014,123 | B2 | 9/2011 | Kayatani et al. |
| 8,178,457 | B2 | 5/2012 | de Rochemont |
| 8,400,754 | B2 | 3/2013 | Ogawa et al. |
| 8,547,683 | B2 * | 10/2013 | Saruban ............ H01G 4/30 29/25.42 |
| 2011/0012707 | A1 | 1/2011 | Koto et al. |
| 2014/0210586 | A1 * | 7/2014 | Atsumi ............ H01F 27/292 336/192 |
| 2015/0083475 | A1 | 3/2015 | Kim et al. |
| 2015/0299848 | A1 * | 10/2015 | Haukka ............ C23C 16/407 427/256 |
| 2016/0090661 | A1 * | 3/2016 | Kitada ............ H01C 1/14 338/22 R |
| 2016/0093440 | A1 * | 3/2016 | Nishisaka ............ H01G 4/248 361/301.4 |
| 2016/0214908 | A1 * | 7/2016 | Chiang ............ C04B 41/52 |
| 2016/0260535 | A1 | 9/2016 | Kubota et al. |
| 2016/0372255 | A1 * | 12/2016 | Maki ............ H01F 41/041 |

FOREIGN PATENT DOCUMENTS

| JP | H07-192967 A | | 7/1995 | |
| JP | 2004-40084 A | | 2/2004 | |
| JP | 2005-057104 A | | 3/2005 | |
| JP | 2005-209992 A | | 8/2005 | |
| JP | 2005209992 A | * | 8/2005 | |
| JP | 2014-225590 A | | 12/2014 | |
| JP | 2017-11256 A | | 1/2017 | |
| JP | 2018-098336 A | | 6/2018 | |
| KR | 20160092394 A | * | 8/2016 | |
| WO | WO-2011108701 A1 | * | 9/2011 | ............ B32B 15/20 |

OTHER PUBLICATIONS

International Preliminary Report on Patentability and Written Opinion issued in PCT/JP2017/043633; mailed Jun. 18, 2019.
An Office Action mailed by the China National Intellectual Property Administration on Jun. 23, 2020, which corresponds to ChinesePatent Application No. 201780062718.5 and is related to U.S. Appl. No. 16/374,649 with English language translation.

* cited by examiner

FIG. 5
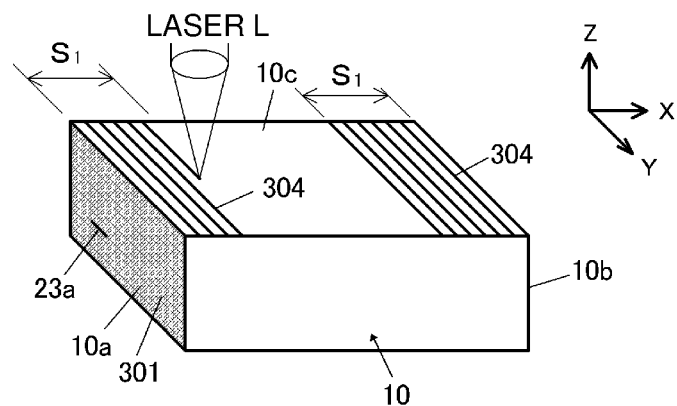
FIG. 6A  LASER PROCESSING INITIAL PERIOD
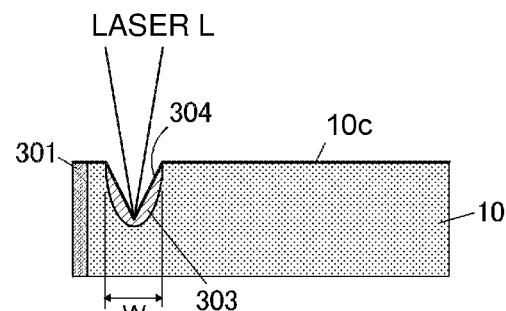
FIG. 6B  LASER PROCESSING FINAL PERIOD
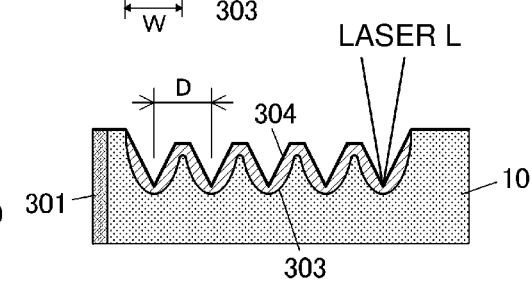
FIG. 6C  PLATING PROCESS
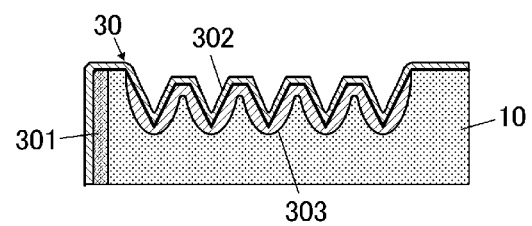

FIG. 12
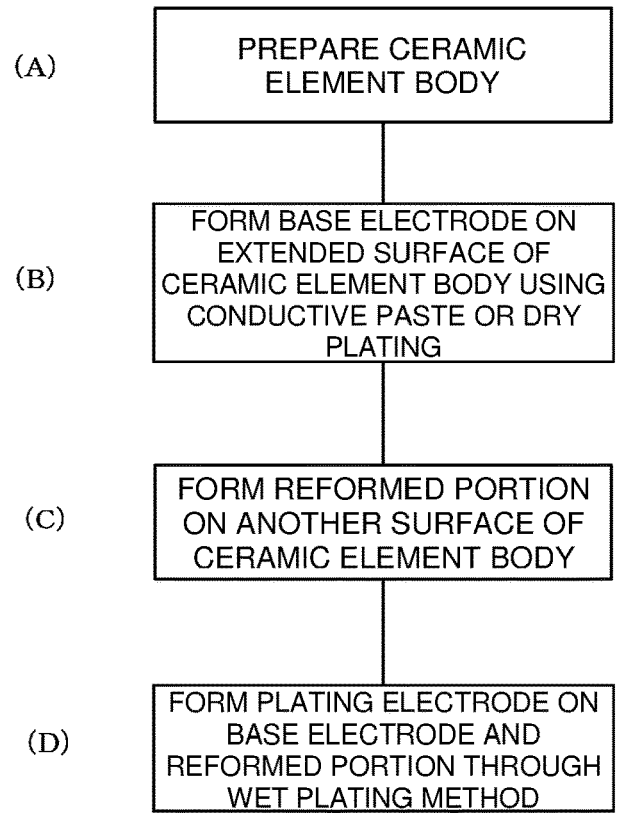
FIG. 13A
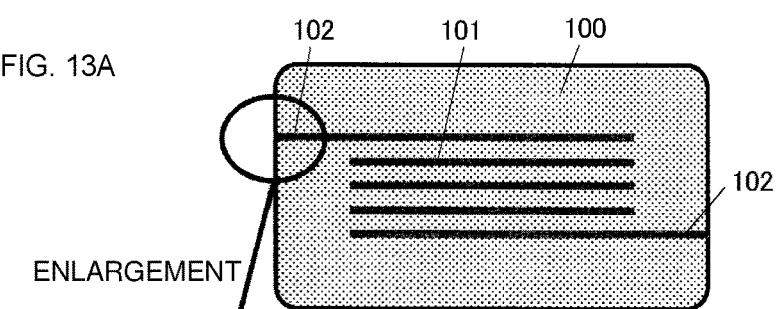
ENLARGEMENT
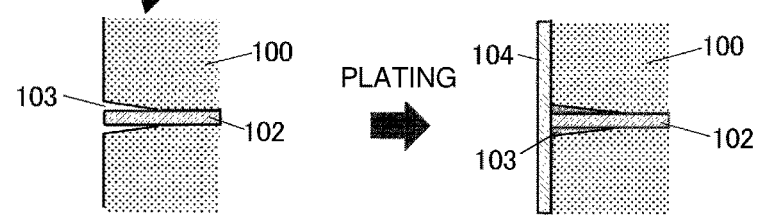
FIG. 13B        FIG. 13C

METHOD OF MANUFACTURING ELECTRONIC COMPONENT AND ELECTRONIC COMPONENT

CROSS-REFERENCE TO RELATED APPLICATIONS

This application is a Divisional of U.S. patent application Ser. No. 16/374,649, filed Apr. 3, 2019, which claims benefit of priority to International Patent Application No. PCT/JP2017/043633, filed Dec. 5, 2017, and to Japanese Patent Application No. 2016-241005, filed Dec. 13, 2016, the entire contents of each are incorporated herein by reference.

BACKGROUND

Technical Field

The present disclosure relates to a method of manufacturing an electronic component, and a method of manufacturing an electronic component, particularly relating to forming an outer electrode on a ceramic element body.

Background Art

In an existing method of forming an outer electrode of an electronic component, in general, an electrode paste is applied to each end surface of a ceramic element body. The electrode paste is subsequently baked or cured to form a base electrode, and then, a plating electrode is formed on the base electrode by a plating process.

For application of the electrode paste, a method of dipping an end portion of the electronic component into a paste film formed with a predetermined thickness or a method of using a transfer by a roller or the like is used. In these techniques, there is a problem that an odd-shaped outer electrode, including an L-shaped electrode, cannot be formed or is difficult to be formed.

In addition, in place of the electrode forming method using the electrode paste as described above, a method has been proposed in which a plurality of end portions of inner electrodes is exposed close to each other on an end surface of a ceramic element body, dummy terminals called an anchor tab are exposed close to the end portions of the inner electrodes on the same end surface, and electroless plating is performed on the ceramic element body, whereby a plating metal is grown using the end portions of the inner electrodes and the anchor tabs as cores, and an outer electrode is formed as described, for example, in Japanese Unexamined Patent Application Publication No. 2004-40084. With this method, the odd-shaped outer electrode can be relatively easily formed.

However, in this method, since the outer electrode is formed by direct deposition of the plating on the end portion of the inner electrode and the anchor tab, there is a possibility that a plating solution enters and remains in a boundary between the ceramic element body and the end portion of the inner electrode, or a boundary between the ceramic element body and the anchor tab. In addition, there is also a possibility that flux contained in solder enters and remains in an interface portion between the ceramic element body and the inner electrode at the time of mounting. These plating solution and flux remaining in the ceramic element body may cause defects such as corrosion or the like under a use environment.

FIGS. 13A through 13C illustrate a cross section of an example of a chip component in a case where an outer electrode is formed only by a plating method as disclosed in Japanese Unexamined Patent Application Publication No. 2004-40084. A reference numeral 100 denotes a ceramic element body, a reference numeral 101 denotes an inner electrode, and a reference numeral 102 denotes an extended portion of the inner electrode. When the ceramic element body 100 is fired, a gap 103 may be generated between the extended portion 102 and the ceramic element body 100 at an interface portion where the inner electrode 101 is extended as illustrated in FIG. 13B due to a difference in shrinkage between the ceramic element body 100 and the inner electrode 101. When plating is performed in this state, a plating solution enters the gap 103 as illustrated in FIG. 13C, and the plating solution is sealed by a plating electrode 104.

SUMMARY

The present disclosure provides a method of manufacturing an electronic component and an electronic component, capable of preventing entrance of a plating solution or a flux component at an interface to which an inner electrode of a ceramic element body is extended, and capable of forming an outer electrode of an arbitrary shape.

According to the present disclosure, an electronic component with an outer electrode formed on a ceramic element body through the following steps is manufactured. First, as illustrated in a step (A) of FIG. 12, a ceramic element body made of a sintered ceramic material containing a metal oxide is prepared. Here, the ceramic element body has an inner electrode, and part of the inner electrode is extended to an extended surface. Next, as a step (B), a base electrode is formed on the extended surface of the ceramic element body so as to be connected to the inner electrode. This base electrode is formed through an electrode forming method using a conductive paste or a dry plating method. Next, as a step (C), by locally heating part of another surface of the ceramic element body adjacent to the extended surface and by reducing part of the metal oxide, a reformed portion is formed. Next, as a step (D), a plating electrode is formed on the base electrode and the reformed portion through a wet plating method, and as a result, an outer electrode is formed.

The present disclosure proposes a method of forming the outer electrode by combining a plurality of kinds of techniques. In other words, first, the base electrode is formed on the extended surface of the inner electrode of the ceramic element body using a method other than the wet plating method. Specifically, the base electrode is formed by the electrode forming method using the conductive paste or the dry plating method. With this, the base electrode and an extended portion of the inner electrode are electrically connected to each other. Since no plating solution is used at the time of forming the base electrode, even if there is a gap at an interface to which the inner electrode of the ceramic element body is extended, the gap is closed by the base electrode. Note that the base electrode does not need to be formed only on the extended surface, and may be extended to part of another surface adjacent to the extended surface. The base electrode does not need to be formed on the entire surface of the extended surface, and it is sufficient for the base electrode to be formed at least on a portion where the inner electrode is extended.

Next, by locally heating part of another surface of the ceramic element body adjacent to the extended surface and by reducing part of the metal oxide included in the ceramic element body, the reformed portion is formed. This reformed portion is a portion having a lower resistance value than that of the other portion of the ceramic element body. Note that either step may be performed first in a formation order of the base electrode and the reformed portion.

After forming the base electrode and the reformed portion, the plating electrode is formed on the base electrode and the reformed portion through the wet plating method. The reformed portion is a portion whose resistance value is lower than that of a non-reformed portion of the ceramic element body, and can therefore serve as a deposition starting point of a plating metal. Since the base electrode is of course electrically conductive, it is possible to easily deposit the plating metal. Even if the gap is generated at the interface to which the inner electrode of the ceramic element body is extended, since the gap is already closed by the base electrode, it is possible to prevent the plating solution from entering the gap during the plating process. By the plating process, the plating electrode is formed on the base electrode and the reformed portion, and as a result, the outer electrode is formed. Note that even if the base electrode and the reformed portion are slightly separated from each other, the plating metal rapidly grows using the plating metal deposited on both elements as a core, so that a continuous plating electrode can be formed. Note that in the case where the base electrode and the reformed portion are formed so as to be separated from each other, the plating electrode may be independently formed on each of them. The formation of the plating electrode may be performed a plurality of times. In other words, the plating electrode may have a multilayer structure. As is well known, the wet plating method is advantageous in that it is possible to form a uniform electrode with excellent mass productivity at a low cost.

A method of forming the base electrode using the conductive paste includes a method of forming the base electrode by applying a conductive paste containing glass and metal powder on the extended surface of the ceramic element body and sintering the metal powder by heat treatment, a method of forming the base electrode by applying a conductive paste containing a thermosetting resin and metal powder on the extended surface of the ceramic element body and curing the thermosetting resin by heat treatment, and the like. In the latter method, the base electrode can be formed at a relatively low temperature compared with the former method. In the present specification, the conductive paste and the electrode paste are used interchangeably. As the dry plating method, for example, a vapor deposition method, a sputtering method, or the like may be used. Any of the methods is an electrode forming method that does not use the plating solution, and it is possible to prevent the plating solution from entering the gap generated at the interface between the ceramic element body and the extended portion of the inner electrode.

As a local heating method for forming the reformed portion, there are various methods, for example, such as laser irradiation, electron beam irradiation, local heating using an image furnace, or the like. Among these, the laser irradiation is advantageous in a point that the apparatus can be made relatively small, and in a point that an irradiation position of the laser with respect to the ceramic element body can be quickly changed. The local heating reforms only a surface layer portion of the ceramic element body, and therefore does not substantially affect electrical characteristics as an electronic component (e.g., an inductor).

A typical ceramic material which can be reformed by irradiation with the laser includes ferrite. The ferrite is a ceramic material containing iron oxide as its main component, and examples thereof include spinel ferrite, hexagonal ferrite, garnet ferrite, and the like. When the ferrite is irradiated with the laser, the irradiated portion is melted and solidified, and the surface layer portion of the ferrite is changed in quality and has conductivity. Examples of the ferrite used for the inductor include Ni—Zn based ferrite, Mn—Zn based ferrite, Ni—Cu—Zn based ferrite, and the like, and the reformed portion can be formed by the laser irradiation for any ferrite. A known laser, such as a YAG laser, a $YVO_4$ laser, or the like can be used as the laser.

It is preferable that the reformed portion be formed at a position on another surface of the ceramic element body adjacent to the extended surface and close to the extended surface. Even when the base electrode and the reformed portion are separated from each other, since the plating metal deposited on the base electrode and the reformed portion grows therebetween at the time of wet plating, the continuous plating electrode can be formed. When the base electrode and the reformed portion are close to each other or in contact with each other, the continuous plating electrode can be formed in a shorter time.

After step (B) in FIG. 12 for forming the base electrode, it is preferable that step (C) for forming the reformed portion be executed. When the reformed portion is formed before forming the base electrode, there is a possibility that the reformed portion is oxidized by heat treatment when forming the base electrode and is made to be a non-conductor. Therefore, by forming the reformed portion after forming the base electrode, oxidation of the reformed portion can be suppressed, and a good plating electrode can be formed thereon. Note that when the heat treatment at the base electrode does not affect oxidation of the reformed portion, the reformed portion may be formed earlier than the base electrode.

As the wet plating method, either method of electrolytic plating and electroless plating can be used, but the electrolytic plating method is easy to control a film thickness and is therefore preferable. Since both the base electrode and the reformed portion formed by the method of the present disclosure have conductivity, the plating metal is rapidly deposited on the base electrode and the reformed portion. In the existing plating method, when plating is not desired to be applied to part of the ceramic element body, it is necessary for a plating preventing material to be applied in advance to the portion for coating or for the plating portion to be removed by cutting or the like. In the present disclosure, since the reformed portion can be locally formed at a portion where the base electrode is difficult to be formed, a coating step of the plating preventing material or the like can be omitted. When the reformed portion is formed by the laser irradiation, since a surface of the reformed portion becomes uneven, there is an advantage in that the fixing strength of the plating electrode is enhanced due to an anchor effect.

An another embodiment of the present disclosure provides an electronic component including a ceramic element body made of a ceramic material containing a metal oxide, the ceramic element body having an inner electrode and having an extended surface to which part of the inner electrode is extended; a base electrode formed on the extended surface of the ceramic element body so as to be connected to the inner electrode, the base electrode being an electrode formed of a conductive paste; a reformed portion formed at another surface of the ceramic element body adjacent to the extended surface and including a reduced metal element of the metal oxide; and a plating electrode formed on the base electrode and the reformed portion. The electrode formed of the conductive paste can also be called a metal composite electrode including a metal and glass, or a metal and a resin. Furthermore, the plating electrode can also be called a metal thin film electrode. In this case, it is possible to prevent entrance of a plating solution or flux into the extended interface of the inner electrode, and thus it is possible to obtain the electronic component with improved durability.

One of features of the method of the present disclosure is that an odd-shaped outer electrode can be easily formed. For example, when base electrodes are formed on both end surfaces of a rectangular parallelepiped ceramic element body in a longitudinal direction, respectively, and reformed portions (e.g., two portions) are formed only at one surface (e.g., a bottom surface) adjacent to both the end surfaces, a pair of L-shaped outer electrodes can be formed. In other words, it is also possible to form the outer electrodes only on both the end surfaces and the bottom surface, and not to form an electrode on an upper surface and both side surfaces in a width direction. Forming the L-shaped outer electrode is advantageous in a point that the parasitic capacitance between the inner electrode and the outer electrode can be reduced and electrical characteristics of the electronic component can be improved because the outer electrode is formed only at a portion necessary for mounting. Additionally, there are an advantage that when the electronic component is mounted on a circuit board or the like at a high density, an insulating distance from an adjacent electronic component is easily secured, an advantage that when a plurality of circuit boards is disposed in parallel to each other in a thickness direction, an insulating distance between the electronic component and a conductive portion of the circuit board disposed thereabove is easily secured, and the like. Furthermore, when the base electrode is formed on each of the end surfaces with the conductive paste, the reformed portion is formed at the bottom surface, and the plating electrode covering the base electrode and the reformed portion is formed, since a thickness of the outer electrode formed on the bottom surface can be reduced as compared with a thickness of the outer electrode formed on each of the end surfaces, it is possible to reduce the height of the electronic component.

As described above, according to the present disclosure, since the wet plating is performed after the base electrode is formed on the extended surface of the ceramic element body, it is possible to suppress the plating solution from penetrating into the interface between the inner electrode and the ceramic element body. Additionally, since the reformed portion is formed at the surface of the ceramic element body adjacent to the extended surface and the plating electrode is formed on the base electrode and the reformed portion, it is possible to form the outer electrode only on the necessary portion. Accordingly, it is possible to easily form the outer electrode of an arbitrary shape.

BRIEF DESCRIPTION OF THE DRAWINGS

FIGS. 4A through 4D include cross-sectional views illustrating steps of forming an outer electrode;

FIG. 5 is a perspective view illustrating an example of a method of irradiating a ceramic element body with a laser;

FIGS. 6A through 6C include enlarged cross-sectional views of an example illustrating a process of forming a reformed portion and a plating electrode;

FIG. 12 shows a flowchart illustrating a method of forming the outer electrode according to the present disclosure; and FIGS. 13A through 13C include cross-sectional views of an example of an existing chip component with an outer electrode formed through steps of a plating method.

DETAILED DESCRIPTION

Figure 1:
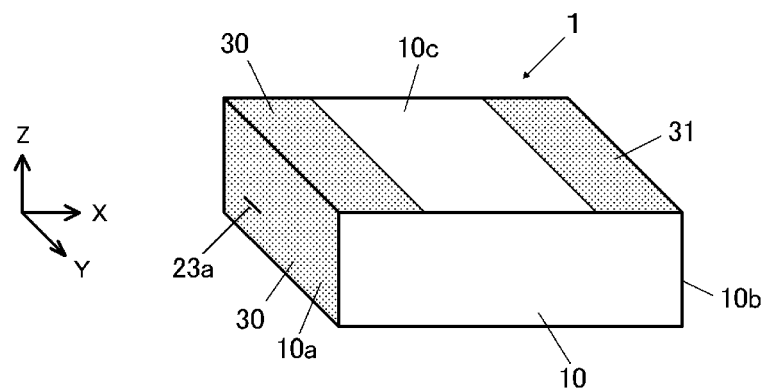
FIG. 1 is a perspective view of an electronic component according to a first embodiment of the present disclosure.

FIG. 1 illustrates a chip type inductor 1 which is an example of an electronic component according to the present disclosure. FIG. 1 illustrates the inductor 1 such that a bottom surface thereof faces upward. The inductor 1 includes a ceramic element body 10, and outer electrodes 30 and 31 are formed on both end portions of the ceramic element body 10 in a length direction, respectively. As illustrated in FIG. 1, a shape of the inductor 1 of this embodiment is a rectangular parallelepiped shape whose dimension in an X-axis direction is larger than those in a Y-axis direction and a Z-axis direction. Note that in this specification, the "rectangular parallelepiped shape" is not limited to a shape with edge-shaped corner portions, may be a shape with chamfered corner portions or corner portions on each of which a rounded surface is formed.

Figure 2:
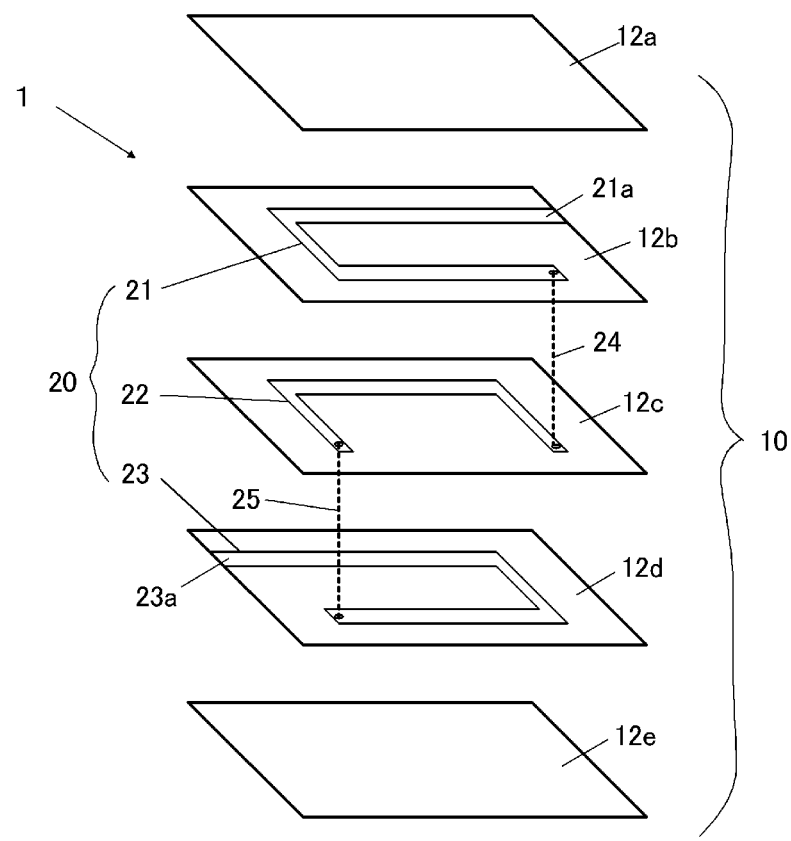
FIG. 2 is an exploded perspective view of the electronic component illustrated in FIG. 1.

As illustrated in FIG. 2, the ceramic element body 10 is obtained by stacking and sintering insulator layers 12a to 12e that take, for example, Ni—Zn based ferrite, Mn—Zn based ferrite, or Ni—Cu—Zn based ferrite as a primary component. The insulator layers 12a to 12e are stacked in this order in a vertical direction (Z-axis direction). On the intermediate insulator layers 12b to 12d excluding the insulator layers 12a and 12e at both upper and lower ends, coil conductors 21 to 23 constituting an inner electrode 20 are formed, respectively. These three coil conductors 21 to 23 are connected to each other by via conductors 24 and 25, and are formed in a spiral shape as a whole. The coil conductors 21 to 23 and the via conductors 24 and 25 are formed of a conductive material such as Au, Ag, Pd, Cu, Ni, and the like. One end portion (extended portion) 21a of the coil conductor 21 is exposed on one end surface 10b of the ceramic element body 10 in the X-axis direction, and one end portion (extended portion) 23a of the coil conductor 23 is exposed on another end surface 10a of the ceramic element body 10 in the X-axis direction. The end surfaces 10a and 10b of the ceramic element body 10 where both the end portions 21a and 23a of the inner electrode 20 are exposed, respectively, are extended surfaces. Note that in this embodiment, an example has been described in which the coil conductors 21 to 23 form a coil with two turns, but the number of turns is arbitrary, and the shape of the coil conductor and the number of layers of the insulator layers can also be arbitrarily selected. Further, the number of layers of the insulator layers 12a and 12e that do not have the coil conductor is also arbitrary.

Figure 3:
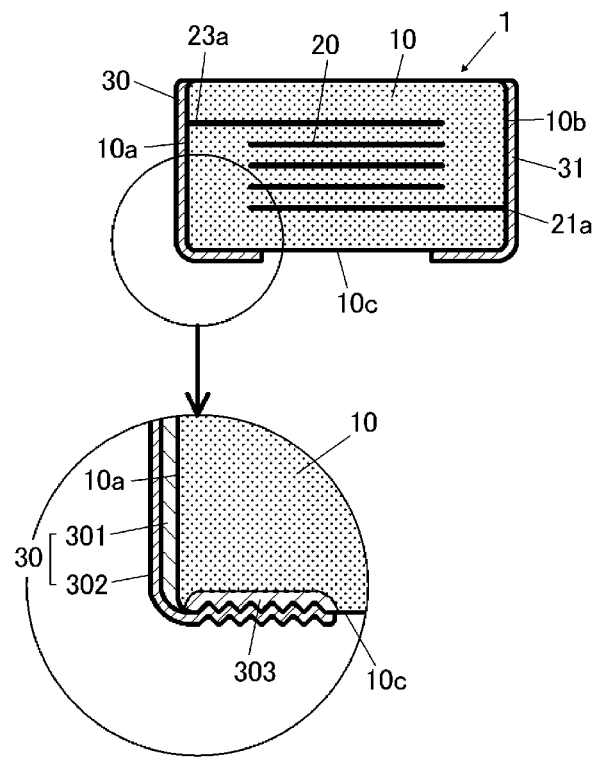
FIG. 3 is a cross-sectional view of the electronic component in FIG. 1 when viewed from a Y direction.

As for the outer electrodes 30 and 31, as illustrated in FIG. 3, when the ceramic element body 10 is viewed from the Y direction, the outer electrodes 30 and 31 are each formed in an L-shape. In other words, the outer electrode 30 is formed in the L-shape so as to cover the one end surface 10a in the X-axis direction and part of a bottom surface (mounting surface) 10c of the ceramic element body 10, and the outer electrode 31 is formed in the L-shape so as to cover the other end surface 10b in the X-axis direction and part of the bottom surface 10c of the ceramic element body 10. As illustrated in FIG. 3, the outer electrode 30 is connected to the extended portion 23a of the coil conductor 23, and the outer electrode 31 is connected to the extended portion 21a of the coil conductor 21. The outer electrodes 30 and 31 are each constituted of two kinds of electrodes. In other words, first, a base electrode 301 is formed on each of the end surfaces 10a and 10b of the ceramic element body 10, and a plating electrode 302 is formed thereon, so that a double-layer structure is formed. In addition, a reformed portion (or low resistance portion) 303 in which the ceramic element body 10 is changed in quality is formed at each end portion of the bottom surface (mounting surface) 10c of the ceramic element body 10, and the plating electrode 302 is also formed on the reformed portion. Note that in FIG. 3, only the base electrode 301, the plating electrode 302, and the reformed portion 303 for one end portion of the ceramic element body 10 are shown, and the base electrode 301, the plating electrode 302, and the reformed portion 303 for the other end portion are omitted. In FIG. 3, since the reformed portion 303 is formed in an uneven shape, the surface of the plating electrode 302 thereon also has an uneven shape. The plating electrode 302 on the base electrode 301 and the plating electrode 302 on the reformed portion 303 are formed simultaneously through a wet plating method. For materials of the base electrode 301 and the plating electrode 302, for example, Cu, Au, Ag, Pd, Ni, Sn or the like is used, and both electrodes may be made of the same metal material or different metal materials. Note that the plating electrode 302 is not limited to have one layer, and may be constituted of multiple plating layers. It is preferable that the plating electrode of the outermost layer be made of a material having good solder wettability.

The method of forming the base electrode 301 is the same as a known method using a conductive paste. In other words, a method of dipping the end portion of the ceramic element body 10 into a conductive paste film formed with a predetermined thickness, a method of using a transfer by such as a roller, and the like are available. It is to be noted that by setting the film thickness of the conductive paste and the dipping depth of the ceramic element body 10, it is possible to adjust whether the conductive paste is applied only to the end surface of the ceramic element body 10 or applied so as to wrap around the surface adjacent to the end surface. Furthermore, it is not necessary for the application region of the conductive paste to be the entire surfaces of the end surfaces 10a and 10b of the ceramic element body 10, and it is sufficient that the conductive paste is applied to at least a portion where the extended portions 23a and 21a of the inner electrode 20 are exposed. After applying the conductive paste, the ceramic element body is subjected to heat treatment at a predetermined temperature to form the base electrode 301. There are two methods for the heat treatment, and when a baking type conductive paste is used, the heat treatment is performed until glass and metal powder contained in the conductive paste are sintered. When a thermosetting type conductive paste is used, a thermosetting resin contained in the conductive paste is cured by the heat treatment. The baking type conductive paste has a higher heat treatment temperature than that of the thermosetting type conductive paste.

Figure 4A:
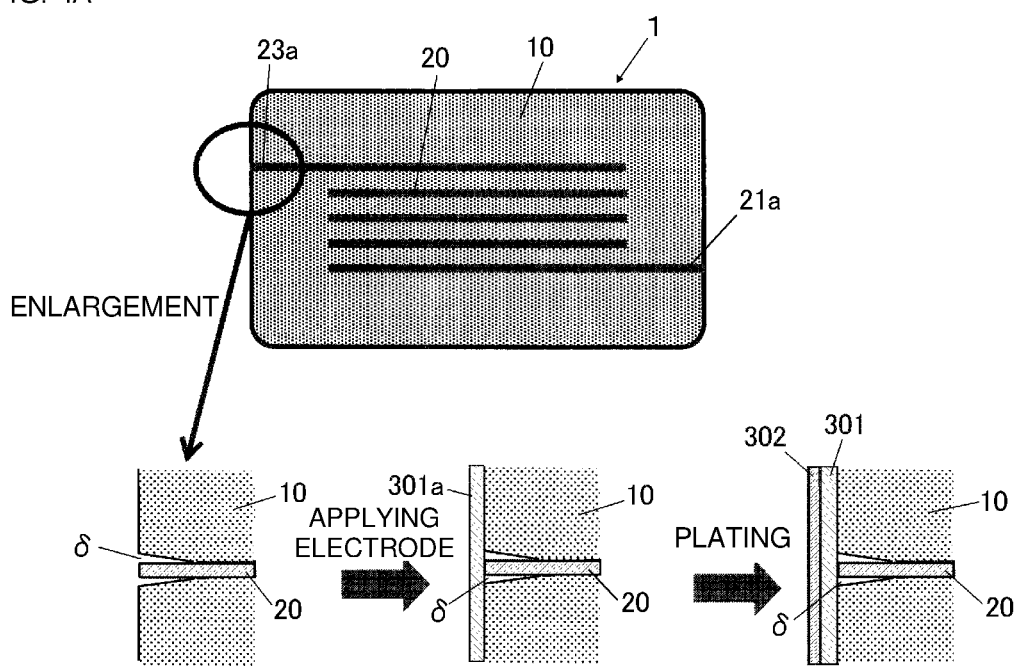

In this way, when the base electrodes 301 are formed using the conductive paste, the base electrodes 301 are formed on the end surfaces 10a and 10b of the ceramic element body 10 on which the extended portions 23a and 21a of the inner electrode 20 are exposed, respectively, and are electrically connected to the extended portions 23a and 21a, respectively, as shown in FIG. 4A. As illustrated in FIG. 4B, when the ceramic element body 10 is fired, a gap δ may be generated in the end surface of the ceramic element body 10 to which the inner electrode 20 is extended due to a difference in shrinkage between the ceramic element body 10 and the inner electrode 20 in some cases. However, as illustrated in FIG. 4C, when the conductive paste is applied, a conductive paste 301a can close the gap δ. Accordingly, it is possible to prevent a plating solution from entering the gap δ in the wet plating performed thereafter as illustrated in FIG. 4D. The plating electrode 302 is formed on the base electrode 301.

FIG. 5 illustrates a method of forming the reformed portions 303 using a laser L at both end portions (electrode forming regions S1) of the bottom surface 10c of the ceramic element body 10 in the length direction. Here, an example is illustrated in which the ceramic element body 10 after the base electrode 301 is formed is irradiated with the laser L, but the ceramic element body 10 before the base electrode 301 is formed may be irradiated with the laser L. There is a plurality of irradiation methods of the laser L, and in this case, an example of scanning along the Y-axis direction while performing continuous irradiation by the laser L (or an example in which the ceramic element body 10 is moved in the Y-axis direction) is illustrated. The scanning by the laser is performed in an arbitrary direction, may be performed in the X-axis direction, or may be performed in a zigzag shape, or a circular shape. By the irradiation of the laser L, a large number of linear laser irradiation marks 304 are formed on the surface of the ceramic element body 10, and the reformed portion 303 is formed at a bottom portion of the irradiation marks 304. Note that FIG. 5 illustrates an example in which the linear laser irradiation marks 304 are formed with intervals in the X-axis direction, but the laser irradiation marks 304 may be densely formed so as to overlap with each other. In addition, instead of the method of continuous irradiation of the laser L, intermittent irradiation may be performed. In any case, it is desirable to uniformly irradiate the entire region of the electrode forming regions S1 and S2 with the laser L.

FIGS. 6A through 6C illustrate an example of a process of forming the reformed portion 303 and the plating electrode 302. FIG. 6A illustrates a state in which the bottom surface 10c of the ceramic element body 10 which is close to the base electrode 301 is irradiated with the laser L, thereby forming the laser irradiation mark 304 having a V-shaped or U-shaped cross section on the surface of the ceramic element body 10. Note that although FIG. 6A illustrates an example in which the laser L converges at one point, in practice, a spot irradiated with the laser L may have a certain area. This laser irradiation mark 304 is a mark in which a surface layer portion of the ceramic element body 10 is melted and solidified by the laser irradiation. Since the central portion of the spot has the highest energy, the ceramic material of the portion is easily changed in quality, and thus the cross section of the laser irradiation mark 304 is substantially V-shaped or substantially U-shaped. A metal oxide (in this case, ferrite) constituting the ceramic element body is changed in quality/reduced, and the reformed portion 303 having a lower resistance value than that of the metal oxide is formed, in the periphery including an inner wall surface of the laser irradiation mark 304. As one of factors for lowering the resistance value of the ferrite material, a reduction reaction is cited in which $Fe_2O_3$ contained in the ferrite changes into $Fe_3O_4$ having a lower resistance value. In addition, in the case of Ni—Zn based ferrite, there is a possibility that part of Fe containing material is reduced and part of Ni and/or Zn containing material is also reduced. In the case of Ni—Cu—Zn based ferrite, there is a possibility that Fe and/or Cu is reduced and Ni and/or Zn is also reduced. A depth and an area of the reformed portion 303 can be varied depending on irradiation energy, an irradiation range, and the like of the laser.

FIG. 6B illustrates a case where irradiation of the laser L with an interval D in the x direction is performed and the electrode forming region S1 is densely irradiated such that the plurality of laser irradiation marks 304 is densely formed. The expression "densely irradiated" means that the interval D between spot centers of the laser irradiation is equal to or smaller than an expansion width (e.g., an average value of a diameter) W of the reformed portion 303, and indicates a state in which the reformed portions 303 formed on a lower side of the laser irradiation marks 304 adjacent to each other are connected to each other. However, it is not necessary for all of the reformed portions 303 to be connected to each other. Therefore, substantially the entire region of the electrode forming region S1 of the ceramic element body 10 is covered with the reformed portions 303.

FIG. 6C illustrates a state in which a plating process is performed on the ceramic element body 10 on which the base electrode 301 and the reformed portion have been formed as described above. Since a current density of the conductive base electrode 301 and reformed portion 303 becomes higher than those of the other portions, the plating metal is quickly deposited on the surfaces of the base electrode 301 and the reformed portion 303, and then the continuous plating electrode 302 is formed thereacross. In other words, the plating metal deposited on the base electrode 301 and the reformed portion 303 becomes a core and grows to the periphery, and even if an insulating region is present between the base electrode 301 and the reformed portion 303, the continuous plating electrode 302 is formed in a short period of time. In this way, the L-shaped outer electrode 30 is formed.

By controlling the plating process time and a voltage or a current, it is possible to control the formation time and the thickness of the plating electrode. Furthermore, by performing an additional plating process on the plating electrode 302 formed by the first plating process, it is also possible to form a plating electrode having a multilayer structure. In this case, since the plating electrode serving as a base is already formed, an additional plating process time can be shortened.

Although FIGS. 6A through 6C illustrate an example in which the dense laser irradiation (D≤W) is performed, it is also possible to perform irradiation with the interval D wider than the expansion width W of the reformed portion 303 (D>W). In this case, although the insulating region other than the reformed portion, that is, a region in which the original metal oxide constituting the ceramic element body is not changed in quality is exposed between the laser irradiation marks 304, in the plating process step which is performed later, the continuous plating electrode can also be formed on the insulating region with ease because the plating electrode grows between the reformed portions 303.

Figure 7:
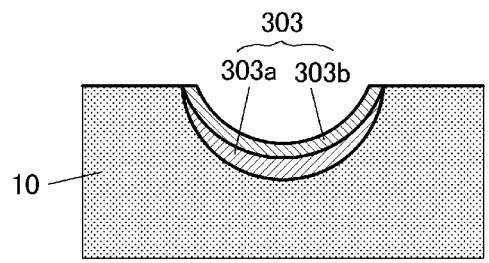
FIG. 7 is an enlarged cross-sectional view of an example of a structure of the reformed portion.

FIG. 7 illustrates an example of a cross-sectional structure of the reformed portion 303 which is formed in this manner. A reduction layer 303a is formed in a lower layer, and a surface layer thereof is covered with a reoxidation layer 303b made of a component of a semiconductor and/or an insulator. The reduction layer and the reoxidation layer constitute the reformed portion 303. Note that the laser irradiation is not limited to be performed in the air atmosphere, the laser irradiation may be performed in a vacuum or an $N_2$ atmosphere, but when the laser irradiation is performed in the vacuum or the $N_2$ atmosphere, there is a possibility that the reoxidation layer is not formed.

When the above-described reoxidation layer is formed, the following effects can be considered. In other words, $Fe_3O_4$ formed as the reoxidation layer has the property of hardly causing the reoxidation at a normal temperature, suppresses the oxidation of the reduction layer of the lower layer, and also has an effect capable of suppressing change in the reoxidation layer itself with time. Furthermore, the reoxidation layer is a kind of a semiconductor, and has a lower resistance value than that of ferrite being the insulator, and has a smaller thickness. Therefore, even if the reoxidation layer is formed, the deposition property of the plating metal is not affected.

In the above description, the reformed portion is formed after forming the base electrode, but it is also possible to reverse the formation order thereof. In other words, it is also possible to form the base electrode after forming the reformed portion. However, when the baking type conductive paste is used as the base electrode, it is desirable to form the reformed portion after the base electrode is formed. This is because, when the reformed portion is formed before forming the base electrode, there is a possibility that the reformed portion is oxidized by heat treatment at the time of forming the base electrode and is made to be a non-conductor. Being made to be a non-conductor may inhibit deposition of the plating electrodes during the plating process which will be performed later. Therefore, when the baking type conductive paste is used, the oxidation of the reformed portion can be suppressed by forming the reformed portion after forming the base electrode.

Figure 8:
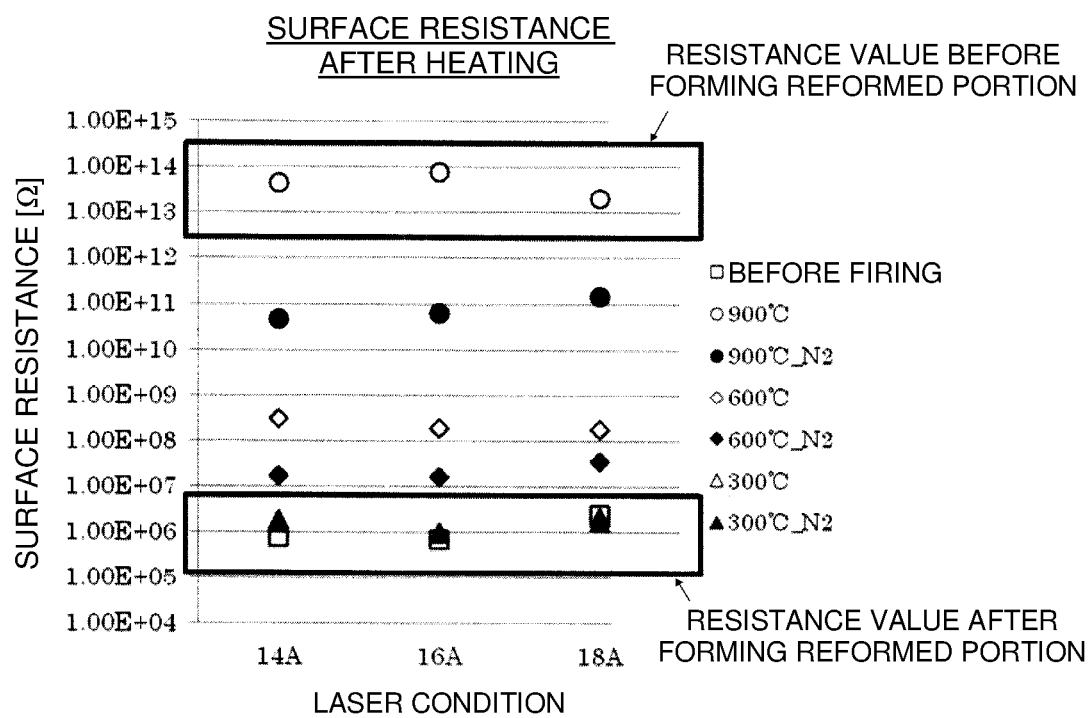
FIG. 8 is a graph showing changes in a resistance value of ferrite before and after the laser irradiation, and changes in the resistance value at reheating.

FIG. 8 shows a relationship between the conductivity of the reformed portion and the heat treatment temperature. That is, for the ferrite material as a target, results of measuring change in the resistance value of the ferrite before the irradiation and after the irradiation of the laser, and the resistance value when the temperature is raised again after forming the reformed portion are shown. In FIG. 8, a surface resistance is obtained by causing a probe to make contact with a surface of the material with regular intervals, and measuring the resistance value therebetween. As is apparent from FIG. 8, whichever laser among the three kinds of lasers is used for the irradiation, the resistance value of the ferrite material is reduced by amount of approximately $10^{-8}$, and thus it can be seen that the reformed portion is certainly formed. On the other hand, when the temperature is raised to 300° C., the resistance value of the reformed portion hardly increases, but by raising the temperature to equal to or higher than 600° C. again, the reformed portion takes behavior of the reoxidation, and the tendency of the resistance value to increase significantly can be confirmed. In general, when the thermosetting type conductive paste is used as the base electrode, since a thermosetting temperature is approximately 200° C., the resistance value of the reformed portion is considered to hardly increase, but the heat treatment temperature of the baking type is equal to or higher than 600° C. in some cases, and therefore the reoxidation of the reformed portion cannot be suppressed. As described above, when a flow of forming the base electrode after forming the reformed portion is performed, when the baking temperature and the curing temperature of the base electrode are at a certain level (e.g., 600° C.) or higher, the resistance value of the reformed portion increases, and there is a possibility that the deposition of the plating is not achieved in the subsequent plating step. Accordingly, it is desirable to employ the flow of forming the reformed portion after forming the base electrode. Note that when this process in which the temperature is raised again is performed in the $N_2$ atmosphere, the reoxidation reaction is suppressed as compared with the case where the process is performed in the air, and therefore the increase amount of the resistance value is suppressed.

—Experimental Example—

Hereinafter, an experimental example in which the reformed portion and the plating electrode are formed will be described.

(1) A sintered ceramic element body made of Ni—Cu—Zn based ferrite was irradiated with a laser with a reciprocating scan. The processing conditions are as follows, but a wavelength may be, for example, in any range of 532 nm to 10620 nm. An irradiation interval means a distance between the spot centers of a forward path and a backward path in the case of the reciprocating scan by the laser.

TABLE 1

| [Laser Processing Condition] | |
| --- | --- |
| Wavelength | 1064 nm (YVO4) |
| Output | 14 A |
| Scanning Speed | 200 mm/s |
| Q switch Frequency | 20 kHz |
| Irradiation Interval (pitch) | 30 μm |
| Spot Diameter | 70 μm |
| Energy Density | 1 J/sec |

(2) Electrolytic plating was carried out on the ceramic element body after the laser irradiation under the following conditions. Specifically, barrel plating was used.

TABLE 2

| [Plating Condition] | |
| --- | --- |
| Plating Solution | Copper pyrophosphate plating solution |
| Rotation Speed [rpm] | 24 rpm |
| Current [A] | 12 A |
| Temperature [° C.] | 55° C. |
| Time | 8 min |

As a result of performing the plating process under the above conditions, forming a good Cu outer electrode having an average thickness of approximately 2 μm on the surface of the ceramic element body was performed. Note that similar results were obtained even when Ni—Zn based ferrite was used. Furthermore, as the plating solution, a copper sulfate plating solution, a copper cyanide plating solution, or the like can also be used in addition to the copper pyrophosphate plating solution.

—Evaluation—

For a sample irradiated with the laser and a sample not irradiated with the laser of the Ni—Cu—Zn based ferrite, the valence of Fe, Cu and Zn on the surfaces of the samples were evaluated, by a K-end XAFS (X-ray absorption fine structure) of Fe, Cu, and Zn using an XPS (X-ray photoelectron spectroscopy) and a conversion electron yield method. As a result of the XPS, a metal component could not be detected at the surface layer portion of the sample irradiated with the laser, and a metal component could be detected at the lower layer portion. Additionally, as a result of the XAFS, the metal component of Cu could be detected at the surface layer portion of the sample irradiated with the laser. On the other hand, as the result of the XAFS, although the metal component of Fe could not be detected at the surface layer portion of the sample irradiated with the laser, the semiconductor component of Fe and the insulator component could be detected. It was also found that a ratio of $Fe^{2+}$ to $Fe^{3+}$ in the lower layer is larger than the ratio in the entire ceramic element body. Accordingly, it is estimated that the metal oxide contained in the ferrite is decomposed by the heat generated by the laser processing, the lower layer of the ceramic element body is reduced to the metal element of the ferrite, and the surface layer portion of the ceramic element body is reoxidized by residual heat.

In the case of the electronic component 1 with the L-shaped outer electrodes 30 and 31 being formed as illustrated in FIG. 1, the following differences also occur in addition to the differences in the electrical characteristics as described above. In other words, since the outer electrode is not formed on the upper surface of the electronic component 1, it is possible to reduce a risk of occurrence of a short circuit even when another electronic component or a conductor is closely present above the electronic component 1 in a mounting state. Furthermore, since the outer electrode is not also formed on both side surfaces in the Y direction, even when another electronic component 3 is mounted adjacent to the electronic component 1 in the Y direction, it is possible to secure an insulating distance from the adjacent electronic component and to secure a distance of the solder applied to the outer electrodes. Therefore, it is possible to reduce the risk of the short circuit with the adjacent electronic component. As a result, in the case of the electronic component 1 with the L-shaped outer electrode, a further high-density mounting can be achieved.

Figure 9A:
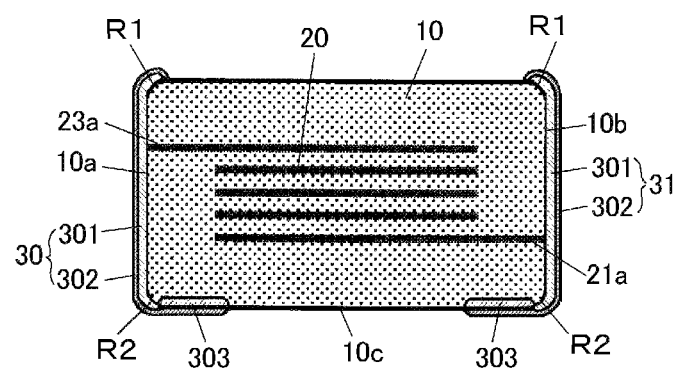
FIGS. 9A through 9C include diagrams illustrating some examples of structures of the outer electrode of the ceramic element body in which a rounded surface is formed on a corner portion.
Figure 9B:
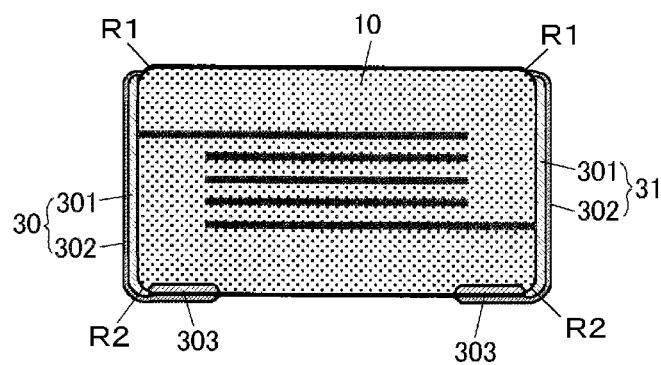
Figure 9C:
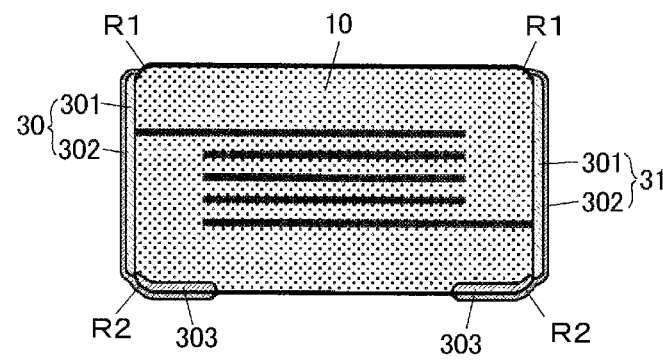

FIGS. 9A through 9C illustrate an example of a structure of the L-shaped outer electrode formed using the present disclosure. In FIG. 9A, when rounded surfaces R1 and R2 are formed at corner portions of the ceramic element body 10, an edge portion of the base electrode 301 is formed so as to extend to the rounded surfaces R1 and R2, and the reformed portion 303 is formed at each of the end portions of the bottom surface 10c of the ceramic element body 10 so as to be in contact with the base electrode 301. The plating electrode 302 is continuously formed on the base electrode 301 and the reformed portion 303, and the L-shaped outer electrodes 30 and 31 are each formed. As described above, when the rounded surface is formed at a boundary portion between each of the end surfaces 10a and 10b and another surface adjacent thereto (including the bottom surface 10c), since part of the base electrode 301 can be caused to wrap around the other surface while maintaining a predetermined film thickness when the base electrode 301 is formed on each of the end surfaces 10a and 10b, the reformed portion 303 can be easily formed in a contact/proximity state with the base electrode 301.

In FIG. 9B, the upper surface side edge portion of the base electrode 301 is formed so as not to extend to the rounded surface R1 of the ceramic element body 10, and the bottom surface side edge portion is formed so as to extend to the rounded surface R2 of the ceramic element body 10. In this case as well, the reformed portion 303 can be formed at the bottom surface 10c of the ceramic element body 10 so as to be in contact with the base electrode 301.

In FIG. 9C, the base electrode 301 is formed only on each of the end surfaces 10a and 10b of the ceramic element body 10. In other words, the edge portions of the base electrode 301 are formed so as not to extend to the rounded surfaces R1 and R2 of the ceramic element body 10, respectively. The reformed portion 303 is formed so as to extend to the rounded surface R2 on the bottom surface side of the ceramic element body 10, that is, so as to be in contact with the base electrode 301. As a result, the plating electrode 302 is continuously formed on the base electrode 301 and the reformed portion 303.

Figure 10A:
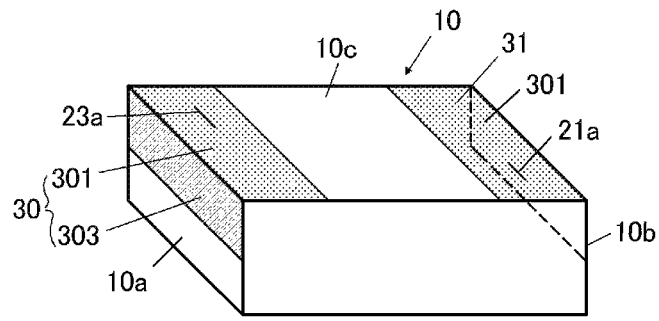
FIGS. 10A and 10B include perspective views of some other examples of the electronic component according to the present disclosure.
Figure 10B:
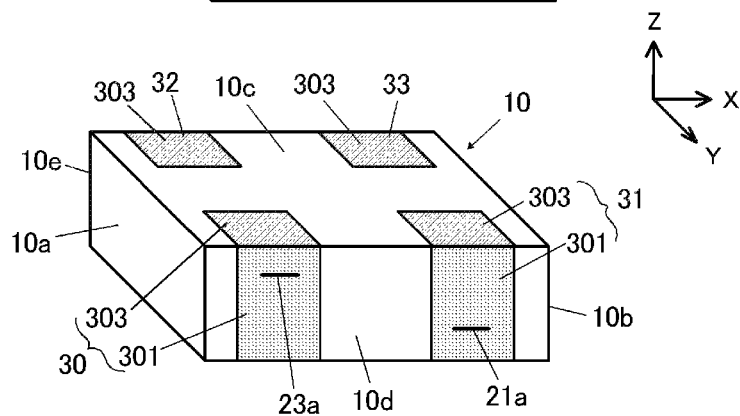

FIG. 10 illustrates another example of the electronic component with the outer electrode formed using the present disclosure. FIG. 10A illustrates an electronic component with the outer electrodes 30 and 31 formed on both the end portions of the bottom surface 10c in the x direction and both the end surfaces 10a and 10b in the x direction of the ceramic element body 10 (illustrated upside down in FIGS. 10A and 10B), respectively. No outer electrode is formed on the other surfaces. In this case, the end portions 21a and 23a of the inner electrode are not exposed on both the end surfaces 10a and 10b of the ceramic element body 10, and are exposed only on the bottom surface 10c. On the bottom surface 10c of the ceramic element body 10, the base electrode 301 is formed so as to be connected to each of the end portions 23a and 21a of the inner electrode. The reformed portion 303 is formed at each of the end surfaces 10a and 10b of the ceramic element body 10, the plating electrode (not illustrated) is continuously formed on the base electrode 301 and the reformed portion 303, and each of the outer electrodes 30 and 31 is formed. In this embodiment, the reformed portion 303 is formed only on the bottom surface side of each of the end surfaces 10a and 10b, but the reformed portion 303 may be formed over the entire surface of each of the end surfaces 10a and 10b.

FIG. 10B illustrates a multi-terminal type electronic component. In this example, the extended portions 21a and 23a of the inner electrode are not exposed on both the end surfaces 10a and 10b of the ceramic element body 10, and exposed on both side surfaces 10d and 10e in the y direction. The base electrode 301 is formed on each of the side surfaces 10d and 10e, and the base electrode 301 and each of the extended portions 21a and 23a of the inner electrode are connected to each other. The reformed portions 303 are formed at four portions on the bottom surface 10c (the surface on the upper side in FIG. 10B) of the ceramic element body 10, respectively. The plating electrode (not illustrated) is continuously formed on the base electrode 301 and the reformed portion 303, and each of the four outer electrodes 30 to 33 is formed. No outer electrode is formed on both the end surfaces 10a and 10b in the x direction and the upper surface (the surface on the lower side in FIGS. 10A and 10B).

Figure 11A:
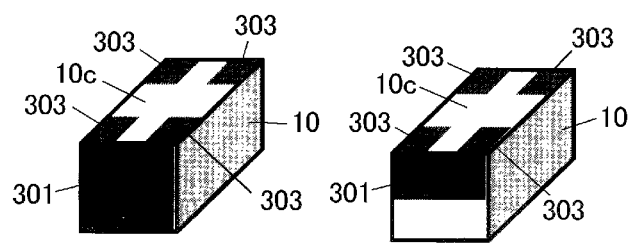
FIGS. 11A through 11D include perspective views illustrating some examples of two-terminal type electronic components according to the present disclosure.

FIGS. 11A through 11D illustrate another example in which the present disclosure is applied to a two-terminal type chip component. In FIG. 11A, the base electrode 301 is formed on each of the end surfaces of the ceramic element body 10, and the two reformed portions 303 are formed at each of the end portions of the bottom surface 10c. Note that the plating electrode formed on the base electrode 301 and the reformed portion 303 is omitted. In this case, since the electrode on the bottom surface side is divided into two portions, there is an advantage in that the mounting stability is improved at the time of soldering to the circuit board.

Figure 11B:
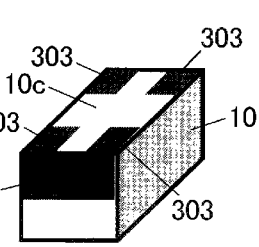

FIG. 11B is the same as FIG. 11A in a point that the reformed portion 303 formed at the bottom surface is divided into two portions, but is different in a point that the base electrode 301 formed on each of the end surfaces is formed only on part of the bottom portion side.

Figure 11C:
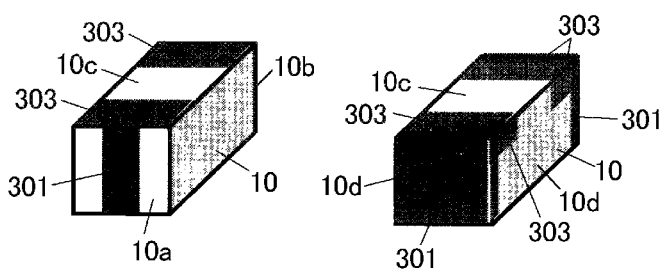

In FIG. 11C, the base electrode 301 is formed not on the entire surface of each of the end surfaces 10a and 10b but in a narrow band shape extending in the vertical direction only at the central portion. The reformed portion 303 on the bottom surface 10c side is formed in a band shape continuous in the width direction.

Figure 11D:
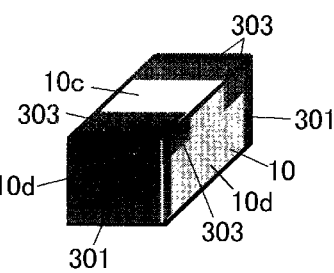

FIG. 11D is the same as FIG. 1 in a point that the base electrode 301 is formed on each of the end surfaces 10a and 10b and the reformed portion 303 is formed on each end side of the bottom surface 10c, but is different in a point that part of the reformed portion 303 extends to both the front and rear side surfaces 10d and 10e.

In the above-described embodiment, an example in which the present disclosure is applied to formation of the outer electrode of the chip type inductor has been described, but the present disclosure is not limited thereto. An electronic component to which the present disclosure is applied is not limited to the inductor, the present disclosure can be applied to an electronic component which uses the ceramic element body in which the quality is changed by the laser irradiation and the reformed portion serving as the deposition starting point of the plating electrode is formed. In other words, the material of the ceramic element body is not limited to ferrite. Although an example using electrolytic plating has been described as the wet plating method, the electroless plating may be used.

In the embodiment described above, the laser irradiation is used as the local heating method, but electron beam irradiation, heating using an image furnace, or the like is also applicable. In any case, since the energy of the heat source can be collected and the ceramic element body can be locally heated, the electrical characteristics of the other regions can be prevented from being damaged.

In the present disclosure, when the laser is used for the local heating, one laser may be split and a plurality of portions may be simultaneously irradiated with the split lasers. Furthermore, a laser focus may be shifted to widen an irradiation range of the laser as compared with a case where the laser is focused.

The present disclosure is not limited to a case where, when the plating metal includes a plurality of layers, the lowermost layer of the plating metal is grown so as to spread over the entire region of the base electrode and the reformed portion. The lowermost layer of the plating metal may be grown so as to spread to part of the base electrode and the reformed portion, and an upper layer of the plating metal may be grown so as to spread over the entire region of the base electrode and the reformed portion.

What is claimed is:

1. An electronic component comprising:
    a ceramic element body including a ceramic material containing a metal oxide, the ceramic element body having an inner electrode and having an extended surface to which part of the inner electrode is extended;
    a base electrode on the extended surface of the ceramic element body and connected to the inner electrode, the base electrode being an electrode configured by a conductive paste;
    a reformed portion at another surface of the ceramic element body adjacent to the extended surface and including a reduced metal element of the metal oxide which is a product of a reduction reaction of the metal oxide that is contained in the ceramic material of the ceramic element body, wherein the reformed portion has laser irradiation marks each having a V-shaped or U-shaped cross-section when viewed in a direction parallel to the another surface, and wherein the reformed portion includes a reduction layer in which the metal element of the metal oxide of the ceramic material of the ceramic element body is reduced, and a reoxidation layer with which the reduction layer is covered; and a plating electrode on the base electrode and the reformed portion.

2. The electronic component according to claim 1, wherein the ceramic element body has a rectangular parallelepiped shape, the extended surface is each end surface of the ceramic element body in a longitudinal direction, the surface at which the reformed portion is present is a bottom surface of the ceramic element body, and the reformed portion is present at each end portion of the bottom surface in the longitudinal direction.

3. The electronic component according to claim 1, wherein the base electrode and the reformed portion are at positions separated from one another by the ceramic element body.

* * * * *